Patented Aug. 22, 1939

2,170,628

UNITED STATES PATENT OFFICE 2,170,628

PROCESS OF REFINING LUBRICATING OILS

Ferdinand W. Breth, Petrolia, Pa., assignor to L. Sonneborn Sons, Inc., a corporation of Delaware No Drawing. Application May 20, 1937, Serial No. 143,731

3 Claims. (Cl. 196—147)

This invention relates to a new process of refining lubricating oils.

Lubricating oil fractions derived from crude petroleum oils contain as a rule various objectionable substances such as coloring matter and constituents that undesirably lower the viscosity index and increase the carbon residue of such oils. In petroleum refining practice it is the customary procedure to remove these undesirable constituents by subjecting the oils to two separate refining steps. One of these steps is designed to substantially decrease the amount of objectionable viscosity index lowering and carbon residue forming constituents and is customarily effectuated by such means as selective solvent extraction and/or acid refining whereas the other consists in passing the oil through an adsorbent material such as fuller's earth and similar adsorbents for the purpose of removing coloring matter to the desired extent.

I have discovered that an activated bauxite of a particular predetermined type when contacted with a petroleum oil under optimum conditions of exhaustive adsorption does not only remove therefrom coloring matter but is additionally capable of selectively removing viscosity index lowering and carbon residue forming constituents. It is thus possible to effect the removal of the aforementioned undesirable constituents from lubricating oils by a simple single step procedure thereby obtaining a product possessing an increased viscosity index and decreased carbon residue and approximating in its properties a selective solvent refined oil from the same stock without, however, possessing the objectionable corrosive characteristics of the latter with respect to certain types of alloy bearings such as cadmium silver and lead copper alloy bearings.

The bauxite that I may use in accordance with my invention is preferably a bauxite of the Arkansas type and by this I mean a bauxite as it is mined in Arkansas and containing a high percentage of water of constitution such as for instance approximately 29–30%. The term Arkansas type bauxite or such similar expression is not intended as a limitation on the origin of the bauxite but merely as a limitation upon the properties and generic structural characteristics of a bauxite as I have found it operative in accordance with my invention and is intended to include bauxites of other origin but of substantially the same structural type and possessing when activated in a manner described below substantially the same potency for selective adsorption of viscosity index lowering and carbon residue forming constituents of an oil and the same adsorptive characteristics; such bauxites include bauxites from India with for instance about 23.8% water of constitution, bauxite from Alabama with a water of constitution between 25 and 30%, bauxite from Georgia with a water of constitution between 29.1 to 33.5%, etc. It is of course understood that the water of constitution is not critical and that bauxites with lower percentages may be used though I have found as a general rule that bauxites with water of constitution above 20% will give best results. Thus where in the specification and claims I refer to a bauxite of the Arkansas type or use such similar expression I mean to define thereby a bauxite of the afore-described character and nature.

Prior to its use the bauxite is preferably activated for example by heating from 600 to 1600° F. and especially between 1000 and 1200° F. Upon heating, bauxite does not sinter like other adsorbent materials, such as fuller's earth, and can be used practically indefinitely. Once the bauxite is exhausted it may be regenerated for re-use by suitable treatment which consists in roasting the bauxite at an elevated temperature and preferably between 600 and 1600° F. The roasting as well as the first activation of the bauxite is usually carried out in a furnace of the Herreshoff type, in a rotary kiln or in a vertical stationary furnace. In case of regeneration the organic matter retained by the bauxite is carbonized and substantially completely removed by maintaining an oxidizing atmosphere in the furnace or kiln. This regeneration of the bauxite and subsequent re-use may be carried out repetitiously so that the process is very economical. In fact I have discovered that the efficiency of the bauxite for selective adsorption is increased after its regeneration and tends to further increase with the number of additional regenerations until a certain maximum is reached when operating under regenerating conditions of optimum efficiency. Thus for instance after the fifth regeneration the efficiency is usually between 40 and 45% higher than that of the freshly activated bauxite. Though the particle size of the bauxite used is not very critical I prefer to employ a bauxite of a particle size between 30 and 200 mesh and preferably for best results a bauxite, the major portion of which will pass between 30 and 60 mesh.

In the practical application of my method the lubricating oil fraction to be treated is contacted with a bauxite of the Arkansas type activated by heating to a temperature of from 1000 to 1200° F. and preferably of a particle size of 30 to 60 mesh for a period of time sufficient to accomplish the removal of coloring matter to the desired extent and the selective adsorption of viscosity index lowering and carbon residue forming constituents in amount sufficient to substantially increase the viscosity index of the oil and preferably by at least 8 points and simultaneously substantially decrease the carbon residue and preferably by at least 0.25%. In fact my new method is so effective that it is possible to obtain in many cases a carbon residue decrease by as high as 1.6% and even higher. Though I may operate at ordinary temperatures I have found it impractical to do so and prefer to effectuate the contact for the requisite period at a temperature between 100° and 300° F. and preferably between 120° and 175° F. The time of contact necessary to achieve the desired result varies with the operating conditions under which the contact between the bauxite and the oil is effected such as temperature, pressure, etc. I have discovered, however, that it is essential in every case for the successful operation of my method that the contact between the bauxite and the oil be so carried out that at least in excess of 3% and preferably in excess of 5% of the total oil treated is adsorbed by the bauxite and I prefer, therefore, to express the time of contact in terms of percentage adsorption. In this connection a sharp distinction must be drawn between the amount of oil mechanically retained and the amount of oil adsorbed by the bauxite. The former constitutes that portion of the oil which, because it only mechanically adheres to the bauxite, may be removed by a gasoline wash; whereas the latter constitutes that portion of the oil which has been adsorbed by the bauxite and, because of its conversion by the bauxite into predominantly asphaltic matter, cannot be removed by ordinary gasoline washing but is removable in the form of asphaltic matter by means of a benzene-acetone-alcohol extraction followed by a supplemental extraction with carbon tetrachloride. The amount of adsorbed oil therefore represents those constituents of the oil that are of an asphaltic matter forming nature and which include in their major portion the viscosity index lowering and carbon residue forming substances selectively adsorbed by the bauxite and therefore the higher the percentage adsorption the better is the quality of the resulting oil with regard to viscosity index and carbon residue formation. Wherever in the specification and claims, therefore, I use the expression "asphaltic matter forming constituents" or such similar term in connection with bauxite treatment of crude lubricating oil fractions, I mean, thereby, those constituents present in such lubricating oil fractions which when adsorbed by bauxite are converted into predominantly asphaltic matter and which contain viscosity index lowering and carbon residue forming substances.

The method of contact as such is not of critical importance and the contact between the bauxite and the oil may be achieved by either adding the bauxite to the oil in a tank or other suitable receptacle and thereafter separating the oil from the bauxite; or by percolating the oil through a layer of the bauxite of sufficient thickness to substantially insure the adsorption to the requisite degree. In practical operations, however, I prefer to achieve the same result by using a bauxite layer of lesser thickness and recirculating the oil through the same two or more times until a total amount of at least 3% and preferably at least 5% of the oil initially present has been adsorbed. In all cases care should be taken that the bauxite is renewed or regenerated as soon as its adsorptive power has been exhausted which usually becomes necessary in the case of fresh bauxite after 500 to 550 gallons of oil per ton of bauxite have been treated or in case of regenerated bauxite depending upon the number of previous regenerations after 550 to 750 gallons of oil per ton of bauxite have been so treated.

It is of course understood that the method in accordance with my invention is not only applicable to the refining of oils so as to remove therefrom coloring matter together with undesirable viscosity index lowering and carbon residue forming constituents but may be also used in the refining of oils that have been previously subjected to a treatment with fuller's earth, or similar adsorbent material. In such cases the oil to be refined in accordance with my new method is already free from such coloring matter and the bauxite treatment will then serve mainly the purpose of removing the viscosity index lowering and carbon residue forming constituents.

Though my new method is applicable to all types of crude lubricating oil fractions containing viscosity index lowering and carbon residue forming constituents, I have found it particularly effective with Pennsylvania grade lubricating oil fractions.

The advantageous results obtainable with the method in accordance with my invention are illustrated on a Pennsylvania grade oil in the following table in which the respective columns marked A represent untreated oil and the respective columns marked B represent bauxite treated oil:

Table

|  | Bright Stock | | SAE 60 | | SAE 50 | | SAE 40 | | SAE 30 | | SAE 20 | |
| --- | --- | --- | --- | --- | --- | --- | --- | --- | --- | --- | --- | --- |
|  | A | B | A | B | A | B | A | B | A | B | A | B |
| Percent carbon residue | 2.26 | .63 | 2.04 | .60 | 1.91 | .56 | 1.67 | .41 | 1.42 | .32 | 1.12 | .23 |
| Viscosity index | 98 | 108 | 98½ | 108 | 100 | 111 | 102 | 113 | 103 | 114 | 103 | 114 |

The products obtained by my new method are distinguished by a considerable appreciation in the viscosity index and lowering of carbon residue regardless of the original viscosity rating and possess in general the characteristics of a solvent extracted oil being at the same time, however, substantially non-corrosive with respect to certain types of alloy bearings.

The foregoing is by way of illustration and not of limitation and I am not to be limited by any of the details but only by the appended claims in which I have endeavored to claim broadly all inherent novelty.

When in the appended claims, the term "activated bauxite" is employed, it is to be understood to mean either a bauxite that has been subjected to initial activation, a used bauxite that has been reactivated, or a mixture containing both initially activated and reactivated bauxite.

I claim:

1. In the refining of lubricating oils, the steps which comprise contacting a lubricating oil fraction, at a temperature between about 100° F. and 300° F., with bauxite activated by heating between about 600° F. and 1600° F., and of a particle size substantially between 30 and 60 mesh, derived from bauxite ore having at least 20% of water of constitution and capable of removing asphaltic matter forming constituents, and maintaining such contact at such temperature for a period of time sufficient to remove from said oil asphaltic matter forming constituents in an amount not less than 3% of the total oil so contacted.

2. In the refining of lubricating oils, the steps which comprise repetitiously contacting a lubricating oil fraction, at a temperature between about 100° F. and 300° F., with bauxite activated by heating between about 600° F. and 1600 F., and of a particle size substantially between 30 and 60 mesh, derived from bauxite ore having at least 20% of water of constitution and capable of removing asphaltic matter forming constituents, and continuing such repetitious contact at such temperature for a period of time sufficient to remove from said oil asphaltic matter forming constituents in an amount not less than 3% of the total oil so contacted.

3. In the refining of lubricating oils, the steps which comprise contacting a lubricating oil fraction containing viscosity index lowering and carbon residue forming constituents, at a temperature between about 100° F. and 300° F., with bauxite activated by heating between about 600° F. and 1600 F., and of a particle size substantially between 30 and 60 mesh, derived from bauxite ore having at least 20% of water of constitution and capable of removing asphaltic matter forming constituents, and maintaining such contact at such temperature for a period of time sufficient to remove from said oil asphaltic matter forming constituents in an amount not less than 3% of the total oil so contacted, thereby removing from said oil viscosity index lowering and carbon residue forming constituents in an amount sufficient to increase the viscosity index of said oil by at least 8 points and simultaneously decrease the carbon residue of said oil by at least 0.25%.

FERDINAND W. BRETH.